2 Sheets—Sheet 1.
H. R. HEYL.
Assignor to the Novelty Paper-Box Co.
MACHINES FOR FORMING AND INSERTING WIRE STAPLES IN PAPER BOXES.
No. 7,608. Reissued April 17, 1877.
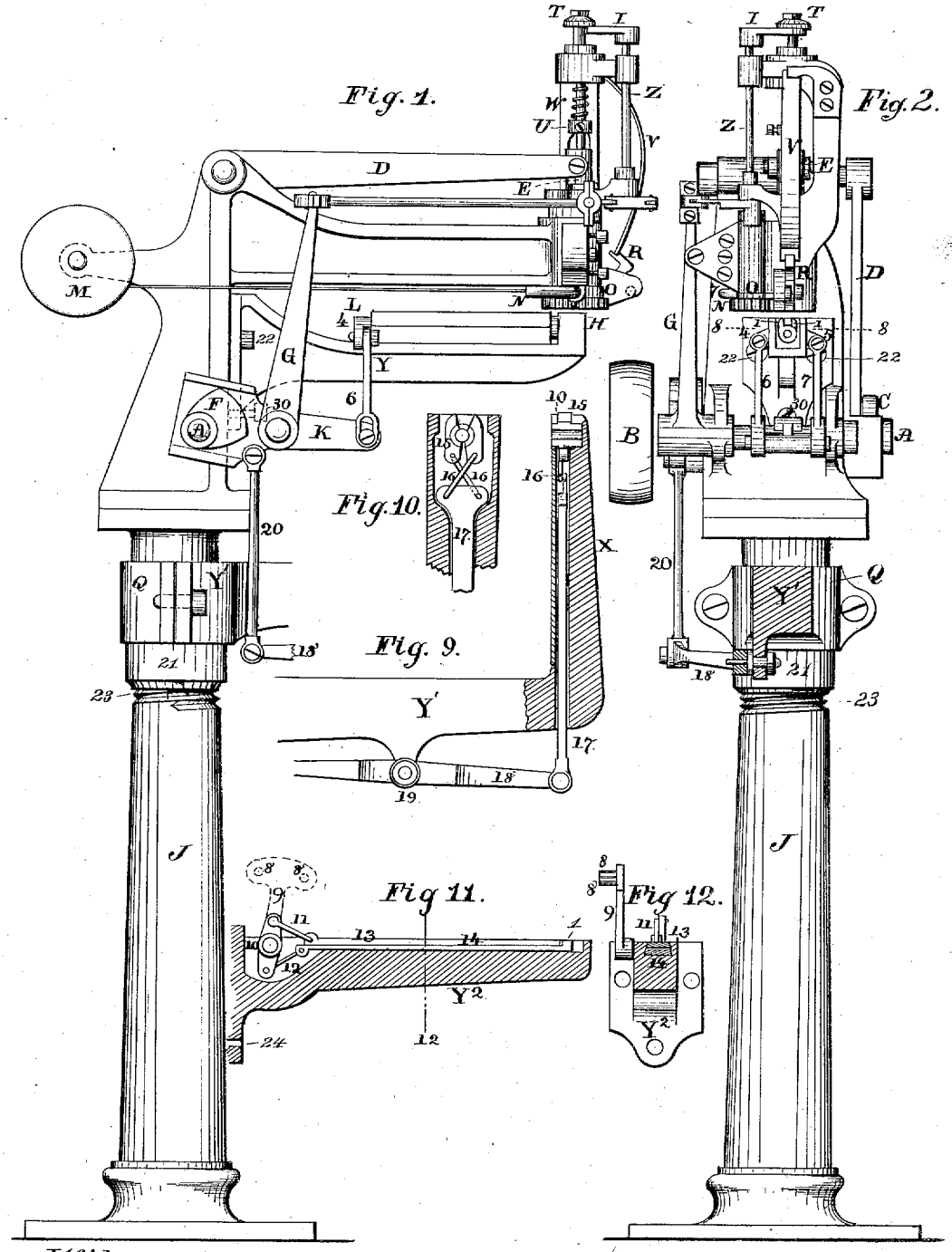
Witnesses:
Geo. H. Graham.
J. J. Walker
Inventor:
Henry R. Heyl,
by Munson & Philipp Attorneys.

2 Sheets—Sheet 2.

H. R. HEYL.

Assignor to the Novelty Paper-Box Co.

MACHINES FOR FORMING AND INSERTING WIRE STAPLES IN PAPER BOXES.

No. 7,608. Reissued April 17, 1877.

Witnesses:
Geo. H. Graham
J. M. Walker

Inventor:
Henry R. Heyl,
by Munson & Philipp, Attorneys.

UNITED STATES PATENT OFFICE.

HENRY R. HEYL, OF PHILADELPHIA, PENNSYLVANIA, ASSIGNOR TO THE NOVELTY PAPER BOX COMPANY.

IMPROVEMENT IN MACHINES FOR FORMING AND INSERTING WIRE STAPLES IN PAPER BOXES.

Specification forming part of Letters Patent No. 175,457, dated March 28, 1876; reissue No. 7,608, dated April 17, 1877; application filed September 26, 1876.

*To all whom it may concern:*

Be it known that I, HENRY R. HEYL, of the city and county of Philadelphia, in the State of Pennsylvania, have invented certain new and useful Improvements in Machines for Forming and Inserting Staples in Making Paper Boxes, of which the following is a specification:

This invention is chiefly a modification of the essential parts of a machine for which a patent was granted to Henry R. Heyl and August Brehmer, dated October 8, 1872, No. 132,078.

The present machine is particularly designed to provide a way to unite, by means of the wire-staple fastening, as set forth in the aforesaid patent, boxes of such sizes and peculiar shapes as are not adapted to the form and limits of said patented machine; but it is capable of uniting such materials as are used in the manufacture of paper boxes, whether the same are superposed in the box form or in the sheet.

The invention consists in improvements in the mechanisms, as will be fully hereinafter pointed out.

Figure 3:
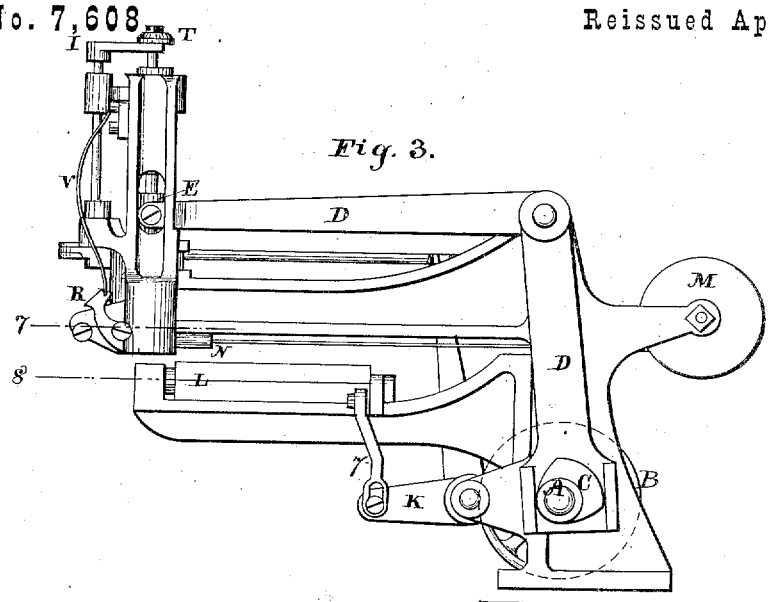
Figure 4:
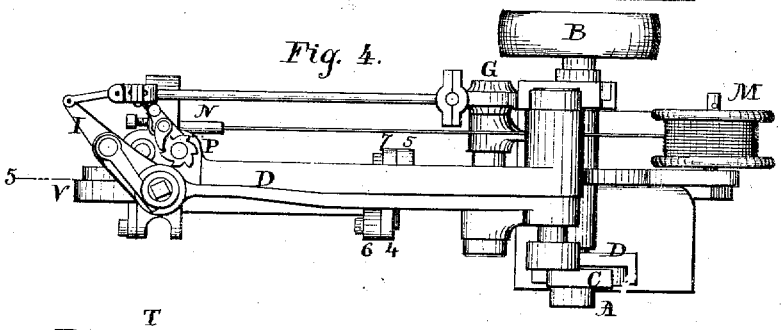
Figure 5:
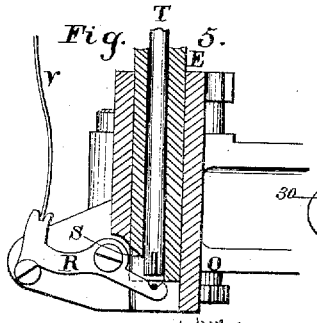
Figure 6:
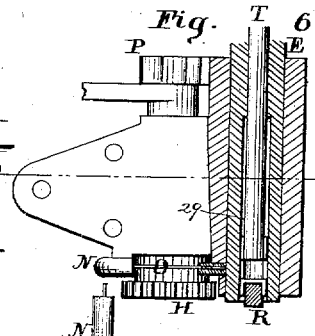
Figure 8:
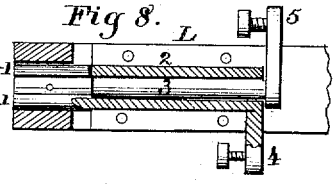
Figure 13:
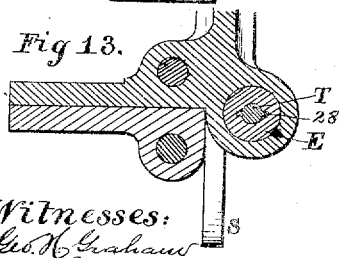
Figure 7:
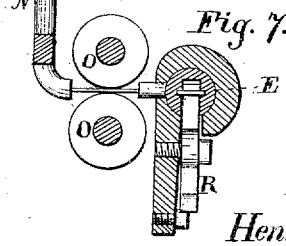

In the accompanying drawings, Figure 1 is a side elevation of the machine; Fig. 2, a front view of the same. Fig. 3 is a side elevation opposite to that shown in Fig. 1; Fig. 4, a plan view; Fig. 5, a vertical section of the staple forming and inserting mechanism; Fig. 6, a vertical section of the same in a plane at right angles to that of Fig. 5; Fig. 7, a horizontal section on line 7 of Figs. 2 and 3; Fig. 8, a horizontal section on line 8 of Figs. 2 and 3; Fig. 9, a sectional elevation of a modified form of clincher and its accessories, viewed from the side, showing also a part of the attaching bracket of this clinching mechanism; Fig. 10, a vertical section on line 10, Fig. 9; Fig. 11, a vertical longitudinal section of a clinching mechanism similar to that shown in the patent hereinbefore referred to, and which may be applied to the present machine; Fig. 12, a transverse section on the line 12, Fig. 11; and Fig. 13, a horizontal section on line 30, Fig. 6.

By reference to the drawings it will be seen that the forming-mold of the machine patented, as aforesaid, is dispensed with, and that the hand must perform the labor of folding the box-blank into the required form, and of placing the parts which are to receive the wire-staple fastening through them into position between the staple forming and inserting mechanisms and the work-supporting arm or bracket.

This process of making boxes, although a somewhat slower one than when they are made by the thoroughly automatic machine, (subject-matter of the aforesaid patent,) is nevertheless of great advantage in the construction of boxes of large dimensions, which must generally be made from several pieces of pasteboard united together, in order to use material economically.

By these same means one is enabled to insert staples and clinch the same in material, taking up a considerable area of space, as in the case of large sheets and boxes of peculiar shapes.

The working parts of the machine are mounted upon a pedestal, J.

The whole mechanism derives motion in proper time through the main shaft A, which is driven by power applied to the pulley B.

To the main shaft are fixed two cam-wheels, one marked C, giving movement to the lever D, which reciprocates the wire-bending fork E, one part of which forms a member of the cutting device, and the other, marked F, operating, through the lever G, the wire-feeding device H, and the lock I of the driving-hammer T, and, through the lever K, the clinching mechanism.

The operation of the machine is as follows:

The wire used to form the staples is placed upon a spool, preferably hung on a stud at M. The wire is led through a bent guiding-tube, N, and between the feed-rollers O, by the frictional contact of which rollers it is drawn forward and pushed directly under the bending-fork, one part of which forms a member of the cutting device, the length of wire fed being controlled by the uniform movement of lever G operating the ratchet P, which is fixed on the shaft of one of the feed-rollers O, said feeding-rollers being geared together so as to revolve in unison.

As the bending-fork is forced downward the wire is cut off and bent over the forming-mandrel R, and into the position shown in Fig. 6, thus forming a staple within the bending-fork E, with its points directed downward.

This forming-mandrel is constructed with a notch across its face at the point where the wire is to be bent over it, which notch serves the purpose of a guide to bring the wire, as it is fed forward, under the center of the bending-fork, so that when the staple is formed it can pass with accuracy into longitudinal grooves in the inside of the bending-fork E, which serve as guides in directing the staple into the material to be stapled. As the bending-fork E continues its descent the shoulder S, with which it is provided, (see Fig. 5,) presses against the forming-mandrel R below its pivot, and pushes it out of position, so that at the proper time the driving-hammer T may slide down through the bending-fork E and force the staple into the material lying below the end of the bending-fork, and supported on the work-supporting arm or bracket over the clinching mechanism L.

The driving-hammer T is provided with feathers 28 on its sides, which run in the longitudinal grooves 29 of the bending-fork. The ends of these feathers thus bear on the staple directly over its legs, while the face proper of the driving-hammer constitutes the bearing for the top or crown of the staple. This construction of inserting mechanism insures the proper guidance and support of the staple as it is inserted through the material, thus directing its legs parallel, or nearly so, with each other and into proper position relative to the clinching mechanism, for it to turn and close them down onto the under side of the material.

The return movement of the forming-mandrel is compelled by the spring V, which is also stiff enough to hold the bending-mandrel firmly against the pressure of the bending-fork while it is bending the wire over it.

The staple is driven by percussion, making its own holes through the material, by the hammer T, which is quickly forced down by the spring W as soon as it is released by the withdrawal of the lock I. This lock I is a simple arm rigidly fixed at the end of a shaft, Z, rocked by means of the lever G, to which it is linked. The driving-hammer T carries a collar, U, which is engaged by the bending-fork in its upward movement, by which arrangement the bending-fork carries the driving-hammer upward with it, and hence no separate device is employed to withdraw the driving-hammer, as is the case in the patented machine hereinbefore referred to. As soon as the driving-hammer is carried up to its highest point the locking-arm I passes under its head and retains it until its force is again required to drive another staple, when the locking-arm is swung out and the driving-hammer is allowed to move downward with the full force of the spring. By this sudden blow the staple is driven by percussion through the material, its legs protruding below the same in position to be engaged by the clinching mechanism.

The clinching mechanism, which turns the legs of the staple toward each other onto the under side of the material, is carried near the end of a work-supporting arm or bracket, Y, and it consists, essentially, of jaws 1 1, which form nippers.

One form of clinching mechanism is shown in Figs. 2 and 8. In this instance one of the jaws 1 1 is attached to a hollow sleeve, 2, and the other to a shaft, 3, within said sleeve, the sleeve and shaft having arms 4 5 projecting in opposite directions and rocked by rods 6 7 connected with the lever K. This is a modification of the original form of clincher, being adapted to clinch the legs of the staple at right angles to the work-supporting arm or bracket Y.

In Figs. 11 and 12 I have shown a clinching mechanism similar to that described in the patent already referred to, but adapted to work horizontally instead of vertically, the staple being driven vertically by this machine instead of horizontally, as in the former machine. The work-supporting arm or bracket $Y^2$ carrying this clinching mechanism is attached at will in place of the similar bracket Y, and its clinching mechanism consists of reciprocating slides or rods 13 14, each having one end upturned to form a jaw, 1, which rods are connected by links 11 12 with a lever, 9, fulcrumed at 10, which is worked by the contact of the lever G with the studs 8.

Still another modification of the clinching mechanism is in the form of a post or horn, with nipper-jaws 15 at the top, as shown at X, Figs. 9 and 10. This post forms part of a work-supporting arm or bracket, $Y^1$, which connects it to the pedestal, as shown in Fig. 1. The nipper-jaws 15 are connected by links 16 to a vertical rod, 17, joined to a lever, 18, which is fulcrumed at 19 to the work-supporting arm or bracket $Y^1$, and actuated through a rod, 20, from the lever K. The object of the clinching device last described is to clinch staples at the bottoms of deep boxes, which cannot be reached by either of the other forms of clinchers shown.

In the operation of this clinching mechanism its jaws, which have angular inner faces, stand apart, and the legs of the staple, as it is projected through the material, strike these angular or inclined faces, and are thereby bent inwardly to a slight degree. The jaws are then moved toward each other, and close said legs down onto the material.

The work-supporting arms or brackets are so constructed that there is a free and unobstructed passage for the work all around them, so that work to be operated upon may be entered between the stapling mechanisms from either side or endwise.

In practice it is necessary to adjust the work-supporting surface in its position relative to the staple-inserting mechanism, and this is accomplished in this machine in two ways.

The work-supporting arm Y or $Y^2$ is hung upon the pedestal by two screws, 22, inserted near its upper edge, and tapped into the pedestal J, while near its lower end an adjusting-screw, 30, is tapped into the bracket, so as to bear against the pedestal. By slightly loosening the screws 22 and turning the screw 30 said bracket may be tilted up, so as to bring its front end, carrying the clinching mechanism, into nice adjustment relative to the staple-inserting mechanism.

The work-supporting arm or bracket $Y^1$ is held upon the pedestal J by a clamp-bearing, Q, which is formed by cutting a seat in the base of said arm or bracket, and providing it with a cap and clamping-screws. This clamp-bearing rests upon, and is raised and lowered by, a nut, 21, which runs on screw-threads 23 cut in the pedestal J. Said arm or bracket may thus be adjusted vertically by the screw-nut, or may be fixed in vertical position by tightening the screws of the clamp-bearing, which adjustment determines the space between the staple-inserting and clinching mechanisms. The said arm or bracket may also swing horizontally upon the pedestal, and thus accurately adjust the inserting and clinching mechanisms in the same vertical plane.

The following is claimed as new:

1. A spring-seated forming-mandrel, in combination with a bending-fork, substantially as described.

2. The combination of a forming-mandrel, constructed with a notch to receive and support the wire, with an internally-grooved bending-fork, substantially as described.

3. The combination of a bending-fork constructed with internal longitudinal grooves, a hammer sliding in said grooves, and clinching devices, substantially as described, the said devices operating to guide, support, and insert a staple through the material, and clinch down its protruding ends.

4. The combination of an overhanging arm and the staple forming and inserting mechanisms with a bracket extending from the supporting-pedestal and staple-clinching mechanism, substantially as shown and described.

5. The work-supporting arm or bracket $Y^1$, constructed in bent or horn form, and provided near its end with clinching mechanism, substantially as and for the purpose described.

6. In combination with the work-supporting bracket Y, the supporting-screws 22 and adjusting-screw 30, substantially as described.

7. In combination with the work-supporting bracket, the clinching-jaws 1 1, hung and rotated upon a common center, substantially as described.

8. The combination, with staple-inserting mechanism, of two rocking-shafts, provided near their extremities with clinching-jaws, to engage with and bend the staple-legs toward each other onto the work, substantially as described.

9. In combination with the staple-inserting mechanism, the clinching-jaws fixed to shafts, automatically rocked to close the said jaws and bend down the staple-legs toward each other, substantially as described.

10. In combination with a staple-inserting mechanism provided with internal guiding-grooves, clinching-jaws operated by means substantially as described, so that their faces shall stand in angular positions and bend the staple-legs toward each other as said legs bear against the said jaws in the process of being inserted through the material, and then be moved to press the said legs onto the material, substantially as described.

11. The combination of a pivoted spring-seated forming-mandrel with a bending-fork, substantially as described.

12. The work-supporting arm or bracket, constructed so as to be adjustable vertically, by means substantially as described, to fixed working positions relative to the staple-inserting mechanism.

In testimony whereof I have hereunto set my hand in the presence of two subscribing witnesses.

HENRY R. HEYL.

Witnesses:

HENRY T. MUNSON,

M. B. PHILIPP.